United States Patent
Buecker

(10) Patent No.: US 6,584,930 B2
(45) Date of Patent: Jul. 1, 2003

(54) MILKING METHOD AND APPARATUS

(75) Inventor: Heinz Buecker, Langenberg-Benteler (DE)

(73) Assignee: Wesfalia Landtechnik GmbH, Oelde (DE)

(*) Notice: Subject to any disclaimer, the term of this patent is extended or adjusted under 35 U.S.C. 154(b) by 0 days.

(21) Appl. No.: 10/036,390

(22) Filed: Jan. 7, 2002

(65) Prior Publication Data

US 2002/0088402 A1 Jul. 11, 2002

(30) Foreign Application Priority Data

Jan. 10, 2001 (DE) .......................... 101 00 840

(51) Int. Cl.[7] .................. A01J 7/04; A01J 5/04
(52) U.S. Cl. ................ 119/14.02; 119/14.47; 119/670
(58) Field of Search ............. 119/14.02, 14.47, 119/14.48, 14.49, 14.5, 14.51, 14.52, 14.53, 14.18, 670

(56) References Cited

U.S. PATENT DOCUMENTS 1,365,665 A * 1/1921 Davies ................... 119/14.51
2,616,809 A * 11/1952 Graves ................ 119/14.02 X

FOREIGN PATENT DOCUMENTS

| DE | 1 937 122 | 4/1966 |
| EP | 0 277 396 B1 | 10/1992 |
| EP | 0 543 463 B1 | 3/2001 |

* cited by examiner

Primary Examiner—Robert P. Swiatek
(74) Attorney, Agent, or Firm—Lawrence E. Laubscher, Sr.

(57) ABSTRACT

A milking method in which at least one teat cup is connected to a teat of the animal to be milked and milked milk is discharged from the teat cup, and in which upon cessation of the flow of milked milk a cleaning medium is passed via a supply line into the teat cup. Furthermore, the present invention relates to an apparatus which is suited for carrying out the method and comprises at least one teat cup which communicates with a milk line conducting milked milk and in the interior of which a supply line ends via which cleaning medium which has been discharged from a source can be introduced into the teat cup. The present invention provides a method and an apparatus for preventing dirt and germs from penetrating into the milked milk with more reliability. According to the invention the cleaning medium as well as air introduced for discharging the milked milk are introduced via the supply line into the teat cup.

10 Claims, 1 Drawing Sheet

MILKING METHOD AND APPARATUS

BACKGROUND OF THE INVENTION

1. Field of the Invention

The present invention relates to a milking method in which at least one teat cup is connected to a teat of the animal to be milked and milked milk is discharged from the teat cup, and in which upon cessation of the flow of milked milk a cleaning medium is passed via a supply line into the teat cup. Furthermore, the present invention relates to an apparatus which is suited for carrying out the method and comprises at least one teat cup which communicates with a milk line conducting milked milk and in the interior of which a supply line ends via which cleaning medium which has been discharged from a cleaning medium source can be introduced into the teat cup.

2. Brief Description of the Prior Art

Such a method is, e.g., known from European Patent No. EP-A-0543 463. In this prior art, the supply line for cleaning medium is connected to a collecting means which has connected thereto various lines. One of said lines conducts a disinfectant. Another one of the lines conducts a rinsing liquid. Finally, a further line is connected to a source of compressed air. All of the above-mentioned media, i.e., disinfecting liquid, rinsing water and air for blowing and drying, are regarded as cleaning media in the sense of the present invention and permit in the prior art a multi-phase cleaning process in which the teat cup removed from the teat and hanging downwards is first sprayed with disinfecting liquid, then rinsed with water and finally at least predominantly dried by blowing out the interior of the teat cup.

The apparatus which is known from the above-mentioned prior art comprises a shutoff nozzle which is directly arranged below the teat cup in the milk line and on which the cleaning medium rests and is discharged through the shut-off nozzle into the interior of the teat cup when subjected to pressure.

In a further prior art which is known from International Application No. WO99/66787, the cleaning medium is introduced into the interior of the teat cup upon cessation of the flow of milked milk, but prior to removal of the teat cup from the teat. The problem created by a mixing of the milked milk, which is drawn off through the milk line, with the disinfecting liquid sprayed onto the teat is to be avoided in said prior art by a valve whose valve body releases the supply line for the cleaning medium and, at the same time, tightly seals the part of the teat cup positioned below when viewed in the direction of flow of the milked milk. However, in this prior art as well the cleaning medium, i.e., first the disinfectant, optionally atomized with compressed air, and later possibly also cleaning liquid, is passed from a central feed line via the supply line to the interior of the teat cup.

In the last-mentioned prior art, the sealing of the line in the flow direction of the milked milk is particularly problematic. Even the slightest irregularities in the wall of the teat cup prevent a reliable seal and thus the imperative separation under the food law of cleaning medium in the form of disinfecting liquid and water, on the one hand, and of the milk obtained during milking, on the other hand.

During milking, a pressure difference is usually created between the udder and the teat tip accommodated in the teat cup. The milked milk is also drawn via this negative pressure from the teat cup via the milk line into the downstream lines and collecting containers. For a better discharge of the milked milk via the teat cups and the milk line into a central milking line, use is often made of milking gears, which e.g. in the case of cows consist of a unit of four combined teat cups, and which near the teat cup are equipped with openings for admitting air, in particular when there are milking gears provided with long lines for discharging the milked milk without use of separate milk-collecting pieces. In such milking gears the milked milk is directly passed from the teat cups into the remote central milking line. The air introduced via the openings during milking effects a decrease in the negative pressure that prompts the milk to exit from the teat into the teat cup.

The inlet openings for the pressure-reducing air simultaneously enable germs and dirt to enter therethrough. The air inlet openings must therefore be cleaned, not least because drawn milk may also get stuck at the inlet openings.

The present invention is based on the technical problem to develop a method of the above-mentioned type such that milked milk is more reliably protected from the penetration of dirt and germs. Moreover, the present invention is to indicate an apparatus which is suited for carrying out the method and with which dirt is easily and efficiently prevented from penetrating into and getting stuck in the milking apparatus.

SUMMARY OF THE INVENTION

As for the problem according to the method, it is suggested by the present invention that the above-mentioned method should be developed such that air is introduced via the supply line into the teat cup upon discharge of the milked milk. Therefore, the method according to the invention provides in the already known way for a cyclic change between the milking process, i.e. discharge of milked milk via a milk line, and the cleaning of the teat cup, optionally with preceding disinfection of the teat accommodated in the teat cup. However, in contrast to the already known prior art, both the cleaning medium and the air for reducing the pressure prevailing in the interior of the teat cup are supplied via a single supply line in the method according to the invention. Germs and/or dirt drawn in during the drawing in of pressure-reducing air in the milk gaining process towards the teat cup are thus automatically flushed out in the subsequent cleaning step and optionally killed by disinfecting liquid. The air drawn in for pressure reduction is introduced in the method according to the invention via the supply line which may have an end remote from the teat cup that is not directly adjacent to the strongly soiled portion located below the udder of the animal to be milked.

For solving the problem according to the apparatus, the above-mentioned apparatus is developed with the present invention by a valve to which a cleaning line communicating with a source, an air-fed pressure-reducing line, as well as the supply line, are to be connected and via which the supply line is selectively connectable to the cleaning line or the pressure-reducing line. In the apparatus according to the invention the supply line which is selectively connectable either to the source for cleaning medium or, however, to the source for pressure-reducing air is positioned between the inlet for air and the teat cup. Dirt which has been introduced via the pressure-reducing line and which passes into the supply line is thus automatically cleaned during cleaning of the teat cup. Not only bacteria and dirt that might have passed through a filter are thereby killed off or washed out, but the outlet opening of the pressure-reducing line on the teat cup is also cleaned and rinsed. The adhesion of milk residues to said place is thereby reliably prevented.

According to a preferred embodiment, the valve of the apparatus according to the invention comprises a valve body which can be moved from a first position in which the supply line communicates with the cleaning line, into a second position in which the supply line communicates with the pressure-reducing line. This embodiment creates a valve which can be cleaned relatively easily, so that also those parts of the apparatus according to the invention that are not rinsed and optionally disinfected in each cleaning phase by introducing cleaning medium can easily be subjected to a cleaning and/or disinfecting process, optionally after disassembly of the valve.

Preferably, the valve body which is accommodated within a housing comprises outlet channels which circumferentially surround the valve body. Furthermore, the valve body comprises at least one valve channel which communicates with the outlet channels in an intermediate position differing from the first and second positions. In this preferred embodiment, the outlet channels communicate with the surroundings, thereby discharging the fluids to the surroundings in case of a possible leakage in the valve. Hence, it is thereby prevented that cleaning medium, in particular water and disinfectant, pass into the teat cup and thus into the milk line and the downstream lines when the milked milk is drawn off.

Moreover, it is possible in the intermediate position to introduce cleaning or disinfecting liquid into the valve through the outlet channels formed in the valve housing, whereby with a corresponding design of the outlet channels a disassembly for the complete cleaning and disinfection of the valve might become superfluous.

This embodiment is of particular advantage when the valve body according to a further preferred embodiment of the present invention is equipped with a passage channel for cleaning purposes that is operative in the first position and with a pressure-reducing passage channel that is operative in the second position. For instance, in the intermediate position the pressure-reducing passage channel can also be rinsed and disinfected with cleaning and disinfecting liquid via the outlet channels.

The formation of a passage channel for cleaning purposes and of a pressure-reducing passage channel in the valve bodies offers the additional possibility of adapting the respective flow channels for the cleaning medium on the one hand and for the pressure-reducing air, on the other hand, in the valve. Lines leading to and away from the valve can therefore be designed in the conventional way. The volume of air admitted during the milking process for pressure reduction is preferably controlled by a pressure-reducing passage channel that is designed as a throttle.

Any contamination of the apparatus according to the invention by the air drawn into the apparatus is efficiently prevented in that an air filter is provided in the pressure-reducing line. For an improved discharge of the milked milk preference should additionally be given to the connection of the pressure-reducing line to a source of pressure, and particular preference should be given to the provision of a periodically controlled air inlet valve on the pressure-reducing line, so that atmospheric air or air with an overpressure can be introduced in pulsed fashion into the teat cup, which is conducive, on the one hand, to an efficient discharge of the milked milk and, on the other hand, to the build-up of an adequate negative pressure for drawing off the milk from the udder.

In particular upon start of the cleaning phase in a teat accommodated in the teat cup, preference should be given to the provision of a shut-off valve for shutting off the milk line. According to a preferred embodiment of the present invention, this shut-off valve is assigned to the milk lines of all teat cups in a milking gear comprising a plurality of teat cups. In this preferred embodiment, the milking gear is shut off at a central place relative to a milk collecting container positioned downstream with respect to the milked milk.

BRIEF DESCRIPTION OF THE DRAWINGS

Further details, advantages and features of the present invention will become apparent from the following description of an embodiment taken in conjunction with the drawing, in which.

DETAILED DESCRIPTION

Figure 1:
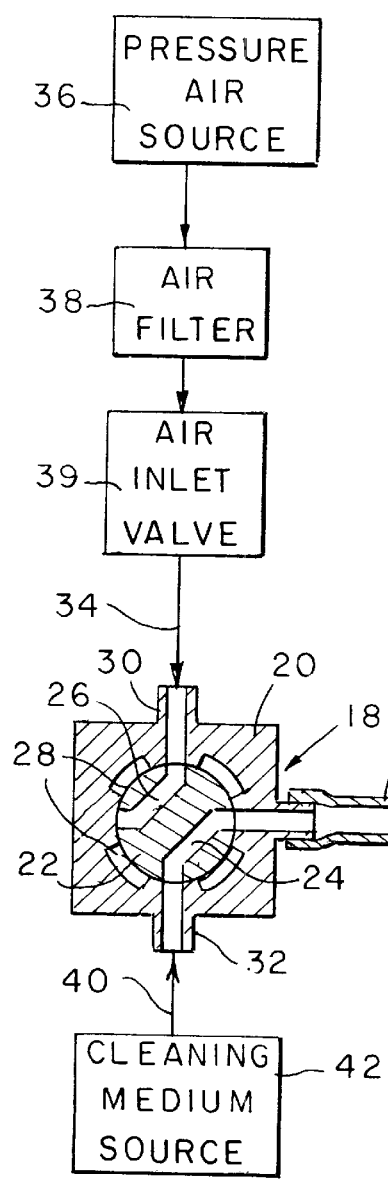
FIG. 1 is a longitudinal sectional view through an embodiment of the apparatus according to the invention.

FIG. 1 shows a teat cup 2 whose lower end communicates with a milk line 4. Said milk line 4 has connected thereto the lines arranged downstream for discharging the milked milk, as well as possible collecting containers.

A connection piece 6 which projects laterally from an inlet channel 8 is positioned between the milk line 4 and the teat cup 2. The exit opening 10 of the inlet channel 8 produces a jet directed to the upper open end of the teat cup 2.

The inlet channel 8 is connected to a supply line 12 which, in turn, is connected to a distributor 14. The distributor 14 comprises an inlet nozzle 14a as well as four outlet nozzles 14b for connecting three further supply lines (not shown here) of a total of four teat cups that are combined to form a milking gear for cows.

The distributor 14 is connected via a connection line 16 to a valve 18. The valve 18 comprises a valve body 22 which is pivotably supported in a valve housing 20. The valve body 22 comprises a passage channel 24 for cleaning purposes, as well as a pressure-reducing passage channel 26 separated therefrom. A plurality of outlet openings 28 are provided in the valve housing 20 and distributed over the circumference of the valve body 22. The outlet openings 28 communicate with the ambiance; i.e., with atmosphere.

Furthermore, the valve housing 20 comprises one connection nozzle 30 connected with a pressure air source 36 by a pressure-reducing line 34 containing an air filter 38 and an air inlet valve 39, and a connection nozzle 32 for a cleaning line 40 connected with a cleaning medium source 42.

In the first position of the valve 18 as shown in FIG. 1, the cleaning line 38 which is connected to the connection nozzle 32 communicates via the distributor 14 with the inlet channel 8. The other end of the cleaning line can be connected to a central collecting means, as is e.g. already known from European Patent No. EP-A-0543463, to which separate lines for different cleaning media, such as disinfectant, water and/or compressed air for drying purposes after the rinsing process, may be connected. Depending on the collecting means, different cleaning media can subsequently be introduced via the cleaning line either successively or simultaneously into the interior of the four teat cups 2. For instance, the teat hanging into the teat cup may first be disinfected, and directly thereafter the milking gear which has been removed from the teat can be disinfected, rinsed and finally substantially dried by introducing disinfecting liquid, water and compressed air. Said cleaning step which is carried out upon cessation of the milk flow of milked milk is carried out each time before the milking gear is connected to the udder of a further cow.

Figure 2:
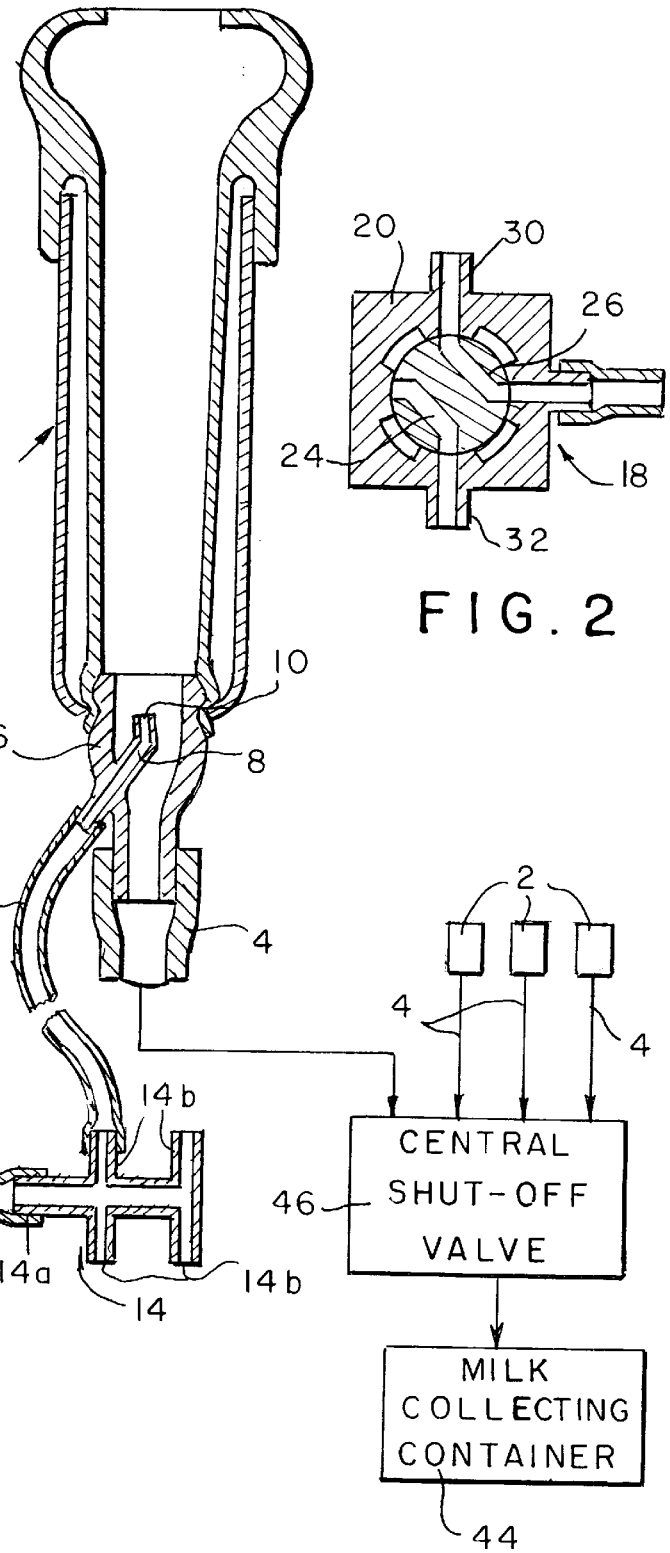
FIG. 2 shows the valve included in FIG. 1 in a second position.

When the milking gear is connected to a cow, or directly thereafter, the valve body 22 is moved from the first position shown in FIG. 1 into the second position shown in FIG. 2. During the milking process, the negative pressure generated via the milk line 4 in the interior of the teat cup 2 can thereby be reduced. The air introduced via the pressure-reducing line effects an increase in the flow rate prevailing in the milk line 4 and the downstream lines. The milk flow of milked milk is thereby improved. Control and regulation of the air supplied via the pressure-reducing line as well as the pressure difference in the air supplied can be controlled via a separate means connected to the other end of the pressure-reducing line. For instance, the flow of supplied air can be pulsed periodically. Apart from an atmospheric pressure, an overpressure can also be introduced into the interior of the teat cup during the milking process.

Upon cessation of the milk flow the valve is again switched over into the first position. The teat of the cow may still be accommodated in the teat cup to first disinfect the same, as has already been described above. At any rate the teat cup 2 is cleaned via the supply line 12, i.e. that line via which air has also been introduced for reducing the pressure in the teat cup. Thus said supply line for pressure-reducing air is cleaned after each individual milking of a cow, i.e. without separate cleaning means being needed for the pressure-reducing line. Rather, the flow path for the air supplied for pressure reduction and that for the cleaning medium are identical between the valve 18 and the outlet channel 8 to each teat cup 2.

The outlet openings 28 provided on the valve body 22 prevent the penetration, in particular, of cleaning medium into the teat cup during milking, as the cleaning medium is discharged via the outlet openings 28 in the event of leakage between valve body 22 and valve housing 20. Moreover, the outlet openings 28 can also be connected to lines for cleaning medium, e.g. after completion of each milking process, i.e. after all cows of a herd have been milked, and the milking gear on the whole is subjected to a thorough cleaning process. If the valve body 22 has been rotated into an intermediate position in which the passage channels 24, 26 communicate with the outlet openings 28, said channels can be cleaned thoroughly by rinsing the outlet openings 28.

A plurality of the teat cups 2 may be provided with their milk lines 4 connected with the milk collecting container 44 via a central shut-off valve 46.

List of Reference Numerals 2 teat cup
4 milk lines
6 connection piece
8 inlet channel
10 outlet opening
12 supply line
14 distributor
14a inlet nozzle
14b outlet nozzle
16 connection line
18 valve
20 valve housing
22 valve body
24 passage channel for cleaning purposes
26 pressure-reducing passage channel
28 outlet openings
30 connection nozzle for pressure-reducing line
32 connection nozzle for cleaning line

What is claimed is:

1. A milking method for milking milk from the teats of an animal, comprising:

(a) connecting at least one teat cup to at least one teat of the animal;

(b) milking milk from said at least one teat into said at least one teat cup;

(c) discharging the milk from said at least one teat cup into a milk line, and simultaneously introducing air into said at least one teat cup via a supply line, thereby to effect an increase in the flow rate prevailing in said milk line; and (d) introducing a cleaning medium into said at least one teat cup via said supply line.

2. A milking apparatus comprising:

(a) a teat cup (2) containing a chamber for receiving the teat of an animal, said teat cup having an outlet for discharging milk into a milk line (4);

(b) means including a supply line (12) for introducing a fluid into said teat cup;

(c) a cleaning line (40) connected with a cleaning medium source (42);

(d) a pressure reducing line (34) connected wit an air source (36); and (e) distributor valve means (18) operable between first and second positions for alternately connecting said supply line with said cleaning line and with said pressure reducing line, respectively.

3. The apparatus according to claim 2, wherein said valve means comprises:

(1) a valve housing (20); and (2) a valve body (22) movable between said first and second positions relative to said housing.

4. The apparatus according to claim 3 wherein said valve body is arranged for rotation relative to said housing between said first and second positions, said valve body containing first (24) and second (26) passages connecting and supply line with said cleaning medium source and said air source when said valve body is in said first and second positions, respectively; and further wherein said valve housing contains a plurality of third outlets (28) connected with atmosphere, said first and second passages being in communication with said third outlets when said valve body is in an intermediate third position between said first and second positions.

5. The apparatus according to claim 3, wherein said first passage (24) comprises a cleaning passage, and wherein said second passage (26) comprises a pressure-reducing passage.

6. The apparatus according to claim 5, wherein said pressure-reducing passage (26) comprises a throttle.

7. The apparatus according to claim 2, wherein said pressure-reducing line contains an air filter (38).

8. The apparatus according to claim 2, wherein said air source to which said pressure reducing line is connected comprises a source of compressed air.

9. The apparatus according to claim 2, and further including a periodically controlled air inlet valve (37) connected in said pressure reducing line.

10. The apparatus according to claim 2, characterized in that a plurality of teat cups (2) are provided having milk lines (4) that are connected with a milk collecting container (40) via a central shut-off valve (42).

* * * * *

UNITED STATES PATENT AND TRADEMARK OFFICE
CERTIFICATE OF CORRECTION

PATENT NO.    : 6,584,930 B2
DATED         : July 1, 2003
INVENTOR(S)   : Heinz Buecker It is certified that error appears in the above-identified patent and that said Letters Patent is hereby corrected as shown below:

<u>Title page,</u>
Item [73], Assignee's name should read -- Westfalia Landtechnik GmbH --

Signed and Sealed this

Fourth Day of November, 2003

JAMES E. ROGAN
*Director of the United States Patent and Trademark Office*